United States Patent [19]

Omori et al.

[11] Patent Number: 4,873,628

[45] Date of Patent: Oct. 10, 1989

[54] COMMAND TRANSLATING COMPUTER

[75] Inventors: Takuro Omori, Yamatokoriyama; Shigenobu Yanagiuchi, Tenri, both of Japan

[73] Assignee: Sharp Kabushiki Kaisha, Osaka, Japan

[21] Appl. No.: 185,283

[22] Filed: Apr. 18, 1988

Related U.S. Application Data

[63] Continuation of Ser. No. 926,846, Nov. 3, 1986, abandoned, which is a continuation of Ser. No. 525,666, Aug. 23, 1983, abandoned.

[30] Foreign Application Priority Data

Aug. 30, 1982 [JP] Japan .............................. 57-151538

[51] Int. Cl.⁴ .............................................. G06F 9/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,084,235 | 4/1978 | Hirtle et al. | 364/200 |
| 4,117,536 | 9/1978 | Bodner | 364/200 |
| 4,370,709 | 1/1983 | Fosdick | 364/200 |
| 4,376,977 | 3/1983 | Bruinshorst | 364/200 |
| 4,415,969 | 11/1983 | Bayliss et al. | 364/200 |

OTHER PUBLICATIONS

J. Dirac, "Call Instruction", IBM Technical Disclosure, vol. 8, No. 12, May 1966, p. 1751.

*Primary Examiner*—David Y. Eng
*Attorney, Agent, or Firm*—Birch, Stewart, Kolasch & Birch

[57] ABSTRACT

A computer includes a memory, a statement translating circuit, and a program executing device. The memory stores a first program with a first command. The statement translating circuit is provided for translating the first command into a second command in a second program. The memory stores the second program with the second command. the program executing device is responsive to the memory for performing the second program with the second command.

5 Claims, 2 Drawing Sheets

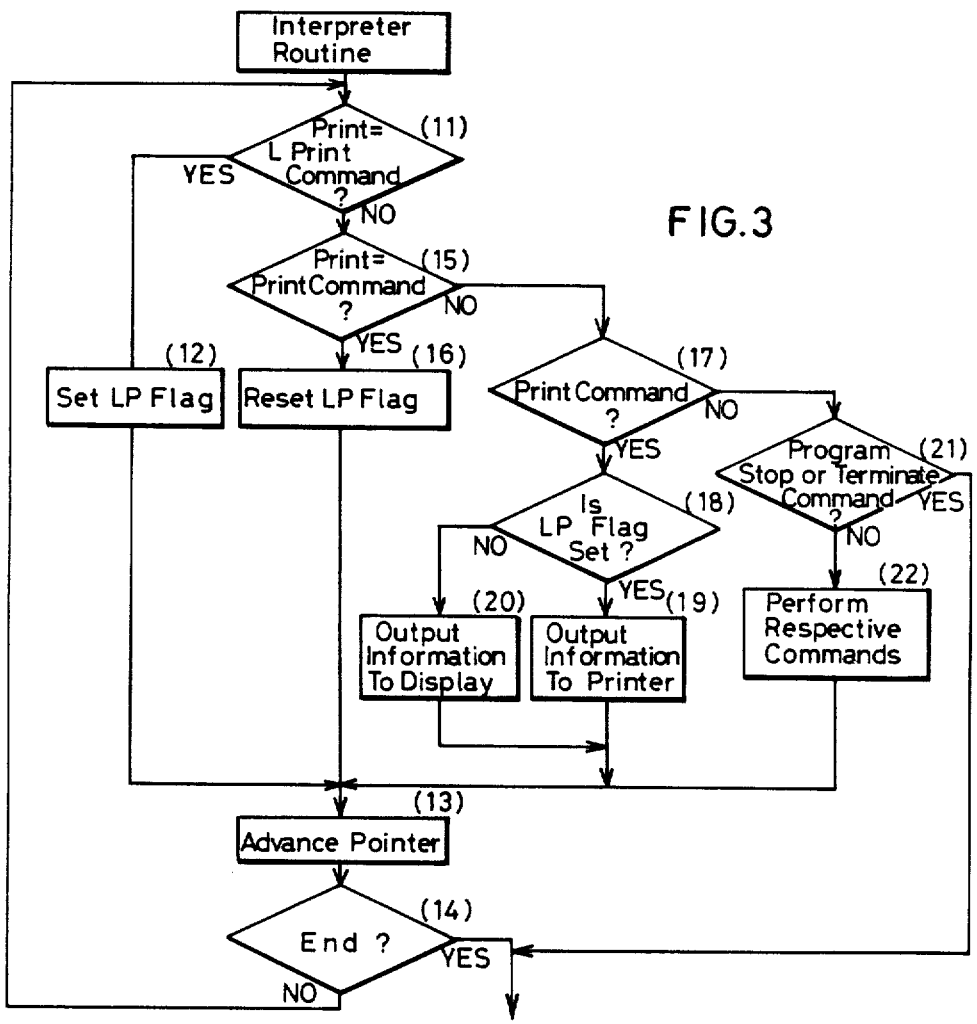

COMMAND TRANSLATING COMPUTER

This application is a continuation of application Ser. No. 926,846 filed on Nov. 3, 1986, now abandoned, which is a continuation of application Ser. No. 525,666 filed on Aug. 23, 1983 and now abandoned.

BACKGROUND OF THE INVENTION

The present invention relates to a computer and, more particularly, to a translating circuit for a computer.

Recently, many kinds of computers have been proposed which include a programmable electronic calculator, a personal computer, and a pocket computer. In these computers, a read/write memory (RAM) or a read-only memory (ROM) module is utilized to store the programs executed by the computer. Any program can contain a plurality of commands. Between a computers having a common command architecture, the same program can therefore be utilized without any program amendment.

Even if the common command architecture is used, however, it may be possible for one or more specific commands to be different, so that entirely different control of the computer is carried out. Such commands must be amended to enable use of the program with another computer, in order to perform the same control with the program. Normally, such program amendment is troublesome.

For example, one computer "A" and the other computer "B" are provided. The computer "A" performs a group of commands referred to as "a" in which a command of "PRINT" instructs the computer to display information. When a printer is connected to the computer "A", the command of "PRINT" instructs the computer to print out the information. The computer "B" performs another group of commands referred to a "b" in which the command of "PRINT" instructs the computer to display information and another command of "LPRINT" instructs the computer to print out the information.

Even when the program containing the commands "a" is applied to the computer "B", the program execution cannot be expected because the input of the command of "PRINT" cannot define either the display command or the print-out command, even referring to the program.

SUMMARY OF THE INVENTION

Accordingly, it is an object of the present invention to provide an improved computer for translating or amending a program.

It is another object of the present invention to provide an improved translating circuit for a computer for translating or amending a specific command during the performance of a program.

It is a further object of the present invention to provide an improved translating circuit for a computer responsive to a statement for performing at least two functions, the statement being contained within a part of program.

Briefly described, in accordance with the present invention, a computer is responsive to a statement within a program for amending or translating a first command of the program into a second command. A memory is provided for storing the second command. The computer is further responsive to the contents of the memory for performing the program with the second command in place of the first command.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 2 and 3 each show a flow chart of the operation of the computer of FIG. 1;

FIG. 4 shows the command structure of a single line command as contained within a program used for the computer of the present invention; and FIG. 5 shows an example of the program used for the computer of the present invention.

DESCRIPTION OF THE INVENTION

A translating or amending circuit of the present invention can be applied to any type of computer including a programmable electronic calculator, a personal computer, and a pocket computer. In a preferred form of the present invention, a programmable electronic calculator is exemplified.

Figure 1:
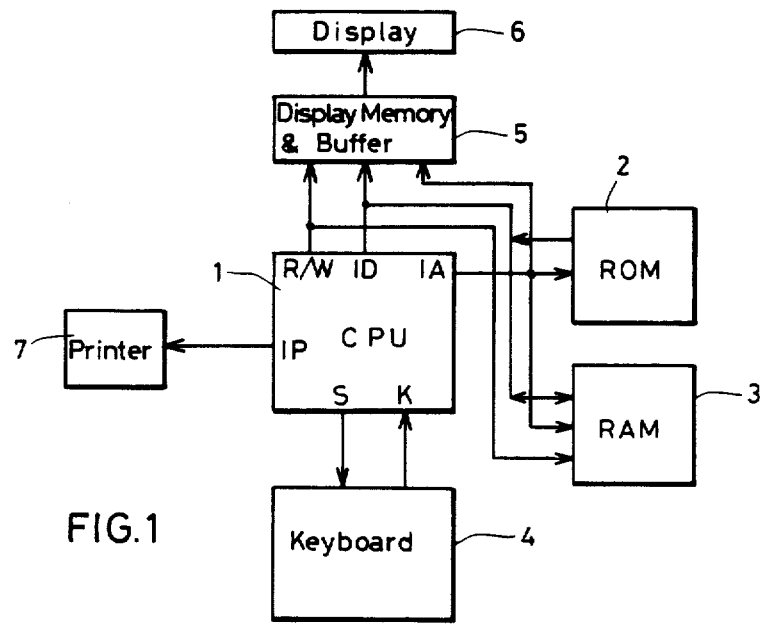
FIG. 1 shows a block diagram of a circuit implemented within a computer according to the present invention.

FIG. 1 shows a block diagram of a circuit of such a programmable electronic calculator.

The circuit of FIG. 1 comprises a CPU 1, a read-only memory (ROM) 2, a random access memory (RAM) 3, a keyboard 4, a display memory and buffer 5, a display 6, and a printer 7.

According to the steps as stored in the ROM 2, the CPU 1 serves to read in key information inputted by the keyboard 4 and to calculate necessary operations. The CPU 1 further serves to write display data into the display memory and buffer 5 to display them. The CPU 1 further serves to write the key inputted information into the RAM 3 and to permit the display 6 to display the display data as stored in the RAM 3. The CPU 1 permits the printer 7 to print out the information corresponding to the display data.

The CPU 1 includes an address bus terminal 1A, a data bus terminal 1D, an input/output port 1P, a read/write signal terminal R/W, a key strobe signal terminal S, and a key input signal terminal K. Read/write (R/W) signals are generated according to both microorders outputted by an instruction decoder and timing signals. The strobe signals S are employed to detect the key inputted information in combination with the key inputted signals.

The ROM 2 stores monitoring steps for reading and displaying key inputted information. Further, the ROM 2 stores interpreter steps for operating so as to comply with the program as stored in the RAM 3. The RAM 3 stores the program and the data.

The keyboard 4 includes a plurality of key switches of ten digit keys, four-rule function keys, a clear key, a clear entry key, an "ENTER" key, and other keys as similar to the conventional calculator.

Figure 2:
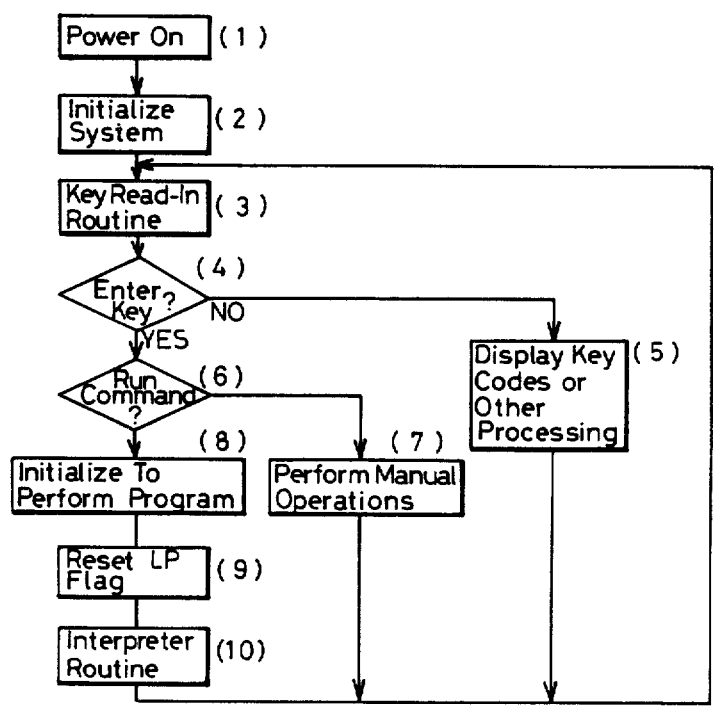

FIG. 2 shows a flow chart of the program as stored in the ROM 2. In a preferred form of the present invention, a program language is Beginner's All-purpose Symbolic Instruction Code (BASIC).

Step (1):
The computer is powered on.

Step (2):
The computer is initialized.

Step (3):
The computer is placed in a key read-in routine for reading key inputted information.

Step (4):
It is detected whether the "ENTER" key is actuated or not

Step (5):
If not, key code display routines or other processing routines are selected. Finally, the key read-in routine of step (3) is reselected.

Step (6):
If it is detected that the "ENTER" key is actuated, it is detected whether key operations of "RUN ENTER" are actuated Step (7):
If not, manual operations are performed to carry out a command or an operation now displayed on the display.

Step (8):
If it is detected that the "RUN" command is actuated, the program presently stored in the body of the computer is performed. For this purpose, the computer is initialized to reset related one or more flags and memories.

Step (9):
An "LP" is reset. The "LP" is such that, during performing the "PRINT" command, the "PRINT" command is applied to the printer 7 while the "LP" flag is set and, otherwise, the "PRINT" command is applied to the display 6 while the "LP" flag is reset. The application of the "PRINT" command to the printer 7 permits the printer 7 to print out information. The application of the "PRINT" command to the display 6 permits the display 6 to display the information.

The "LP" flag is formed within the RAM 3.

Step (10):
An interpreter routine is selected. Thereafter, the key read-in routine of step (3) is reselected.

FIG. 3 shows a more detailed flow chart of the interpreter routine (10) of FIG. 2.

Step (11):
It is detected whether the command is present which sets the "PRINT" command equal the "LPRINT" command, referred to as "PRINT=LPRINT".

Step (12);
If so, the program permits the "LP" flag to be set.

Step (13):
A pointer for directing a command to next be performed is advanced.

Step (14):
It is detected whether the program ends or not. If not, step (11) is reselected.

Step (15):

When "NO" is detected in step (11), step (15) is selected to detect whether the command is present which sets the "PRINT" command equal to the "PRINT" command, as referred to "PRINT=PRINT". If "YES" is the result of the detection in step (15), the "LP" flag is reset. Step (13) is then selected.

If "NO" is detected in step (15), it is detected whether the "PRINT" command is present. If "YES" is obtained indicating the print command is present, the "PRINT" command is performed.

Step (18):
It is detected whether the "LP" flag is set or not.

Step (19):
If the "LP" flag is set, the displayed is outputted into the printer 7.

Step (20):
If the "LP" flag is reset, the displayed data is outputted into the display 6.
Thereafter, step (13) is selected.

Step (21):
If "NO" is detected in step (17), step (21) is selected to detect whether a program end command such as "END" or "STOP" is present or not. If so, the interpreter routine ends. If not, the respective commands are performed, so that steps (22) and (13) are selected.

FIG. 4 shows the structure of a single line segment of a specific program.

The single line segment of the program is formed with commands of "LINE NUMBER", one or more command sentences, and "ENTER". The program contains a plurality of segments.

After step (13) of FIG. 3 has been performed, the pointer is placed at the beginning of a next command sentence.

FIG. 5 shows an example of a specific program used for the present invention.

With reference to FIG. 5, the following program, is inputted:

| | |
|---|---|
| 10 | PRINT=LPRINT |
| 20 | PRINT "PRINTER" |
| 30 | PRINT=PRINT |
| 40 | PRINT "DISPLAY" |

The "LP" flag is set during performing the "10" line command. The "20" line command permits the printer 7 to print out "PRINTER". The "30" line command permits the "LP" flag to be reset. The "40" line command permits the display 6 to display "DISPLAY".

According to the present invention, back to the example recited in the "BACKGROUND OF THE INVENTION" section of the present application, at least one statement for translating or dividing at least two functions is inserted into the program, to detect, for example, "PRINT=LPRINT" and "PRINT=PRINT", so that it is detected that the "PRINT" command in the commands (a) means the "LPRINT" command in the commands (b). The "LP" flag is provided for detecting whether such a statement is present. The "LP" flag is an essential part of the translating or amending circuit of the present invention.

Thus, a little program amendment such as the insertion of a statement into the program permits the commands (a) to be applied to the computer "B".

In any program suitable for the computer "B", the "PRINT" command can be used to instruct both the "DISPLAY" command for causing the display to display data and the "PRINT" command for causing the printer to print out the data without any separating reference to the "DISPLAY" command and the "PRINT" command. During the program, the function of the "PRINT" command can be identified and determined depending upon the program's object.

The above-described preferred embodiment of the present invention is such that the translation of the specific program command is carried out relied upon the statement within the program. The program translating command can be inputted by operating any command key or selecting a slide switch for selecting a mode. In such a case, no program amendment is required to perform the program as such. Therefore, it is applicable to such a computer where the program is fixedly stored and no program amendment is permitted by the computer.

While only certain embodiments of the present invention have been described, it will be apparent to those skilled in the art that various changes and modifications may be made therein without departing from the spirit and scope the present invention as claimed.

What is claimed is:

1. A computer of a first type, comprising:

memory means, for storing control instructions, program instructions, commands and interpreter instructions;

said program instructions representing commands, each particular program instruction being executable by the computer of the first type or by a computer of a second type, a particular program instruction being executable by the computer of the first type to cause a first result, said particular program instruction being executable by the computer of the second type to cause a second result, said first and second results being different, said interpreter instructions specifying whether said particular program instruction in said memory means is to be interpreted as either a first command for the computer of the first type or a second command for the computer of the second type; and program execution means, responsive to said control instructions from said memory means and said interpreter instructions, for performing operations under control of said control instructions and said interpreter instructions, including, translation means, operatively connected to said memory means and responsive to said interpreter instructions, for translating said particular program instruction into a translated first command for the computer of the first type;

said translated first command for the computer of the first type commanding a result in the computer of the first type that is equivalent to said second result commanded by said second command of the computer of the second type.

2. The computer of claim 1 wherein said translation means includes flag means, responsive to said interpreter instructions, said translation means being responsive to said flag means, for storing a flag to indicate whether translation of said particular program instruction is to be performed by said program execution means.

3. The computer of claim 2 wherein said translation means further includes translation switch means, responsive to said interpreter instructions, for selectively setting and resetting said flag stored in said flag means.

4. The computer of claim 2 wherein said program execution means is responsive to a particular control instruction for resetting said flag stored in said flag means.

5. The computer of claim 4 further comprising printer means for printing data and display means for displaying data, said particular program instruction when executed in the computer of the second type enabling operation of only one of said printer means and said display means, said particular program instruction when translated into said translated first command for the computer of the first type enabling operation of a same one of said printer means and display means enabled in the computer of the second type.

* * * * *